(12) United States Patent
Taylor et al.

(10) Patent No.: US 7,428,242 B2
(45) Date of Patent: Sep. 23, 2008

(54) ACTION LIST FOR A SPLIT MEDIA ACCESS AND CONTROL LAYER COMMUNICATIONS SYSTEM

(75) Inventors: James Larry Taylor, Epone (FR); Jong Kwan Choi, San Jose, CA (US)

(73) Assignee: Staccato Communications, Inc., San Diego, CA (US)

( * ) Notice: Subject to any disclaimer, the term of this patent is extended or adjusted under 35 U.S.C. 154(b) by 633 days.

(21) Appl. No.: 10/910,240

(22) Filed: Aug. 2, 2004

(65) Prior Publication Data

US 2006/0034269 A1    Feb. 16, 2006

(51) Int. Cl.
*H04L 12/66*    (2006.01)
(52) U.S. Cl. ........................ 370/463; 370/469
(58) Field of Classification Search .......... 370/463
See application file for complete search history.

(56) References Cited

U.S. PATENT DOCUMENTS 6,847,654 B2 *  1/2005  Zegelin ............... 370/463
7,031,341 B2 *  4/2006  Yu .................... 370/469
7,149,196 B1 * 12/2006  Bims .................. 370/328
2004/0114592 A1 * 6/2004  Kang et al. ............ 370/389
2004/0185899 A1 * 9/2004  Hayem et al. .......... 455/552.1

OTHER PUBLICATIONS

IEEE 802.11H 2003.*

* cited by examiner

*Primary Examiner*—Chau T. Nguyen
*Assistant Examiner*—Eunsook Choi
(74) *Attorney, Agent, or Firm*—Van Pelt, Yi & James LLP (57) ABSTRACT

A split MAC layer system is disclosed. The split MAC layer system comprises an upper MAC portion wherein the upper MAC portion is dependent on a MAC protocol, a lower MAC portion wherein the lower MAC portion is independent of the MAC protocol, and wherein the upper MAC portion communicates information to the lower MAC portion using an information structure including an action pointer.

18 Claims, 7 Drawing Sheets

ACTION LIST FOR A SPLIT MEDIA ACCESS AND CONTROL LAYER COMMUNICATIONS SYSTEM

CROSS REFERENCE TO RELATED APPLICATIONS

This application is related to co-pending U.S. patent application Ser. No. 10/892,814 filed Jul. 15, 2004 entitled A SPLIT MEDIUM ACCESS AND CONTROL LAYER COMMUNICATIONS which is incorporated herein by reference for all purposes.

FIELD OF THE INVENTION

The present invention relates generally to communications systems. More specifically, an action list for a split media access and control layer communications system is disclosed.

BACKGROUND OF THE INVENTION

Figure 1:
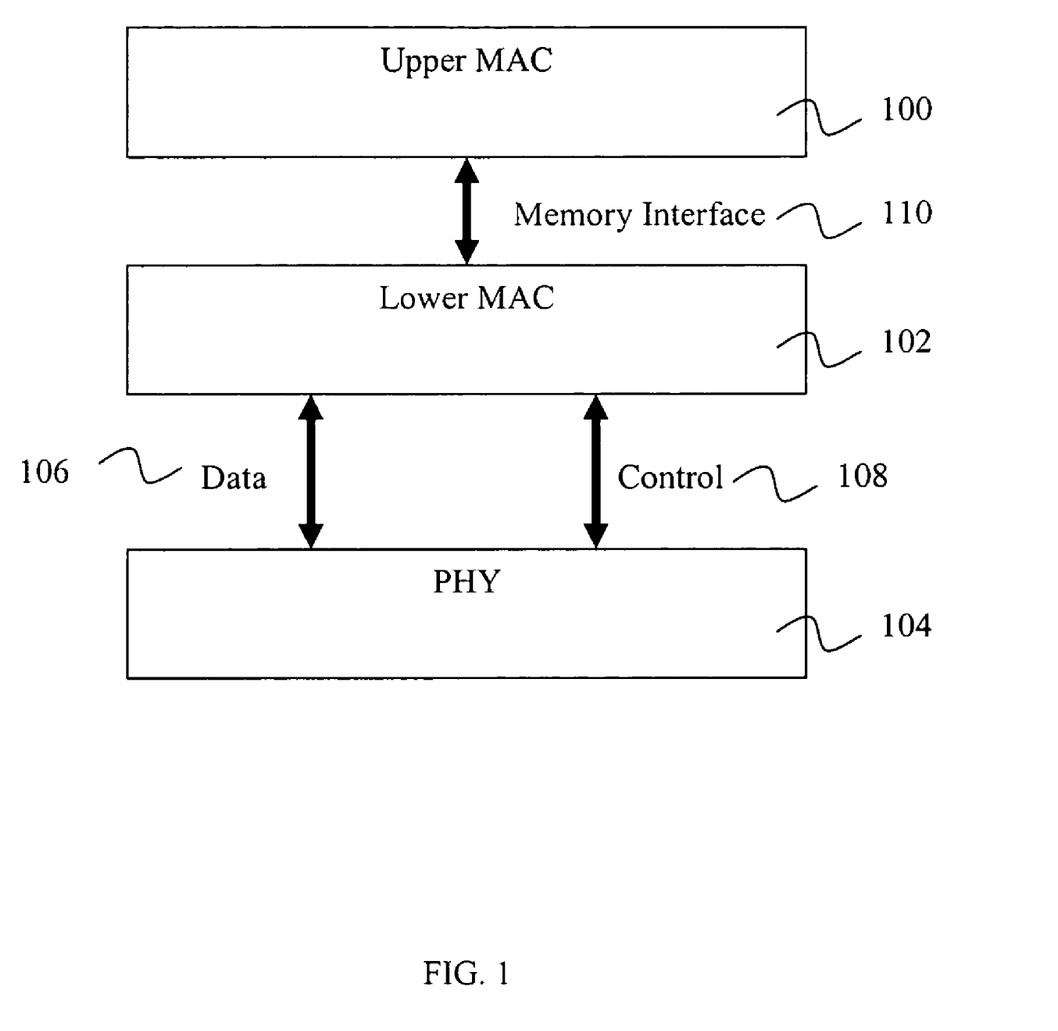
FIG. 1 is a block diagram illustrating a split medium access and control (MAC) architecture and the interfaces between an upper MAC layer portion and lower MAC portion and a physical (PHY) layer.

FIG. 1 is a block diagram illustrating a split media access and control (MAC) architecture and the interfaces between an upper MAC layer portion and lower MAC portion and a physical (PHY) layer. The interface between lower MAC portion 102 and PHY layer 104 is a hardware interface. Data information 106 and control information 108 are passed over this interface. This interface is specific to the hardware configuration of the lower MAC portion and of the PHY. The interface between upper MAC portion 100 and lower MAC portion 102 is via memory interface 110. Since memory interfaces are generally uniform, this configuration allows for different upper MAC portions, and therefore different upper MAC portion protocols, to interface to the same lower MAC portion and PHY layer components without changing the hardware interfaces. Therefore, the MAC layer protocol can change or multiple MAC protocols can be supported without change to the lower MAC portion and the PHY layer components. Only the upper MAC portion is dependent on the MAC protocol; the lower MAC portion is independent of the MAC protocol. Having a universal interface information structure also makes the upper MAC to lower MAC interface universal.

In some embodiments, upper MAC portion functionality is performed using software which enables flexibility. In some embodiments, lower MAC portion functionality is performed using hardware which enables faster performance. However, because there are situations where the upper MAC software performance may not process a message fast enough to provide certain responses within a required time. A technique is required to accelerate responses when a split MAC architecture is used.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An action list for a split medium access and control (MAC) layer communication system is disclosed. An action list is a list of actions that can be defined by the upper MAC portion and performed by the lower MAC portion in order to improve response performance of the communication system when processing a received message. The action list is passed between the upper MAC portion and the lower MAC portion in an interface information structure. Actions are a series of instructions that are performed by the lower MAC portion when a defined pattern matches masked data at a defined location in the received message.

Figure 2:
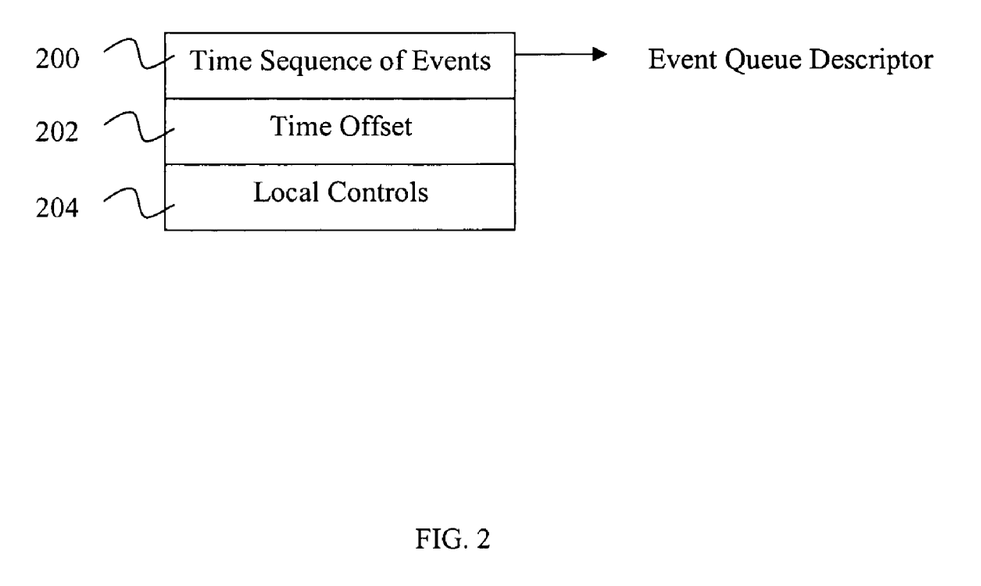
FIG. 2 is a block diagram illustrating an interface information structure for communicating between the upper MAC portion and lower MAC portion.

FIG. 2 is a block diagram illustrating an interface information structure for communicating between the upper MAC portion and lower MAC portion. This information structure contains time sequence of events 200, time offset 202, and local controls 204. The time sequence of events is described using an event queue descriptor. The time offset synchronizes the upper MAC portion and the lower MAC portion. The local controls allow for commands such as standby or reset.

Figure 3:
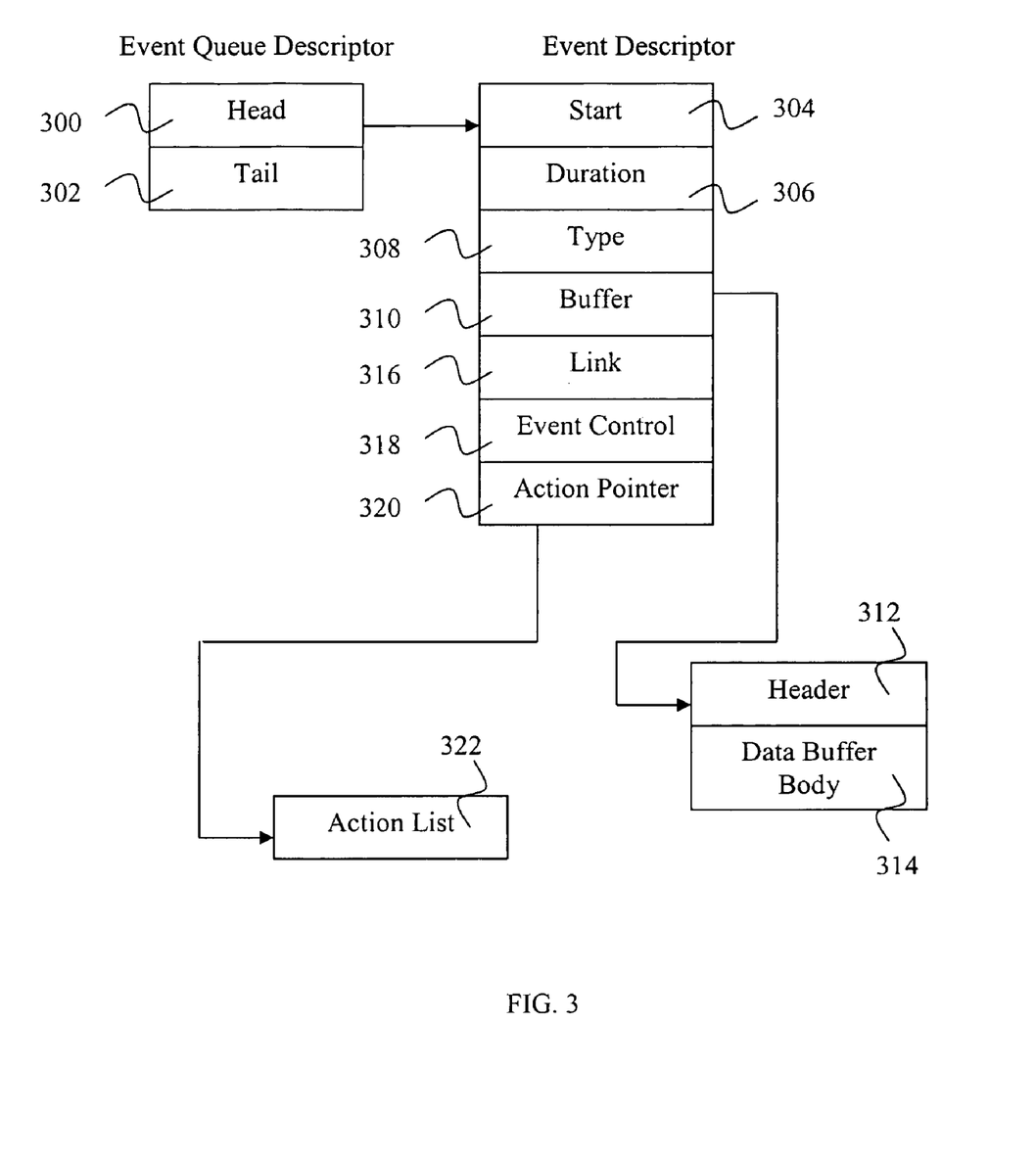
FIG. 3 is a block diagram illustrating an event queue descriptor information structure, an event descriptor information structure, and a buffer information structure.

FIG. 3 is a block diagram illustrating an event queue descriptor information structure, an event descriptor information structure, and a buffer information structure. The event queue descriptor information structure contains head 300 and tail 302. The head points to the first event descriptor and the tail points to the last event descriptor. The event descriptor contains start 304, duration 306, type 308, buffer 310, link 316, event control 318, and action pointer 320. Start 304 defines the time for starting the event. Duration 306 defines the duration of the event. Type 308 describes the type of event. Types of events may include transmit, receive, sleep, or broadcast. Buffer 310 points to a data information structure containing header 312 and data buffer body 314. Link 316 points to the next event descriptor. Event control 318 can be a condition such as sense before transmit. Action pointer 320 points to action list 322.

Figure 4:
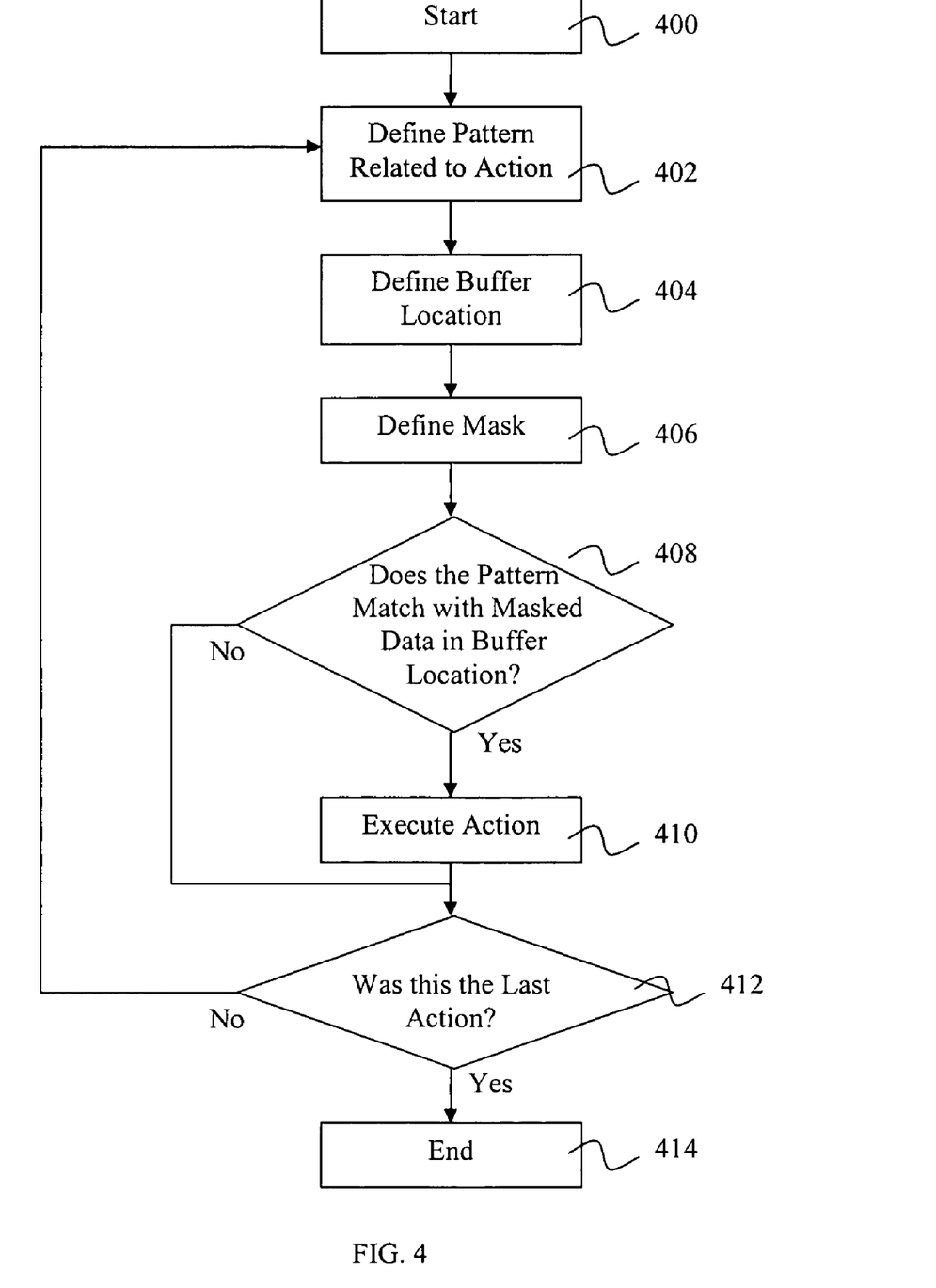
FIG. 4 is a flow diagram illustrating steps for determining if an action in the action list needs to be executed by the lower MAC portion.

FIG. 4 is a flow diagram illustrating steps for determining if an action in the action list needs to be executed by the lower MAC portion. In step 400, the process is started. In step 402, a pattern related to an action is defined. In step 404, a buffer location is defined. In step 406, a mask is defined. In step 408, it is determined if the pattern matches data in the buffer location as masked by the mask. If the pattern matches, the action is executed in step 410. If the pattern does not match, step 410 is skipped. In step 412, it is determined if there are any more actions in the list. If there are more actions, the next pattern related to an action is defined by returning to step 402. If there are no more actions, the process is ended in step 414.

The following examples show three different types of actions where response performance of the system can be improved by having the lower MAC portion execute a series of commands: immediate acknowledge, checking the device addressed, and checking the error status of a message.

Figure 5:
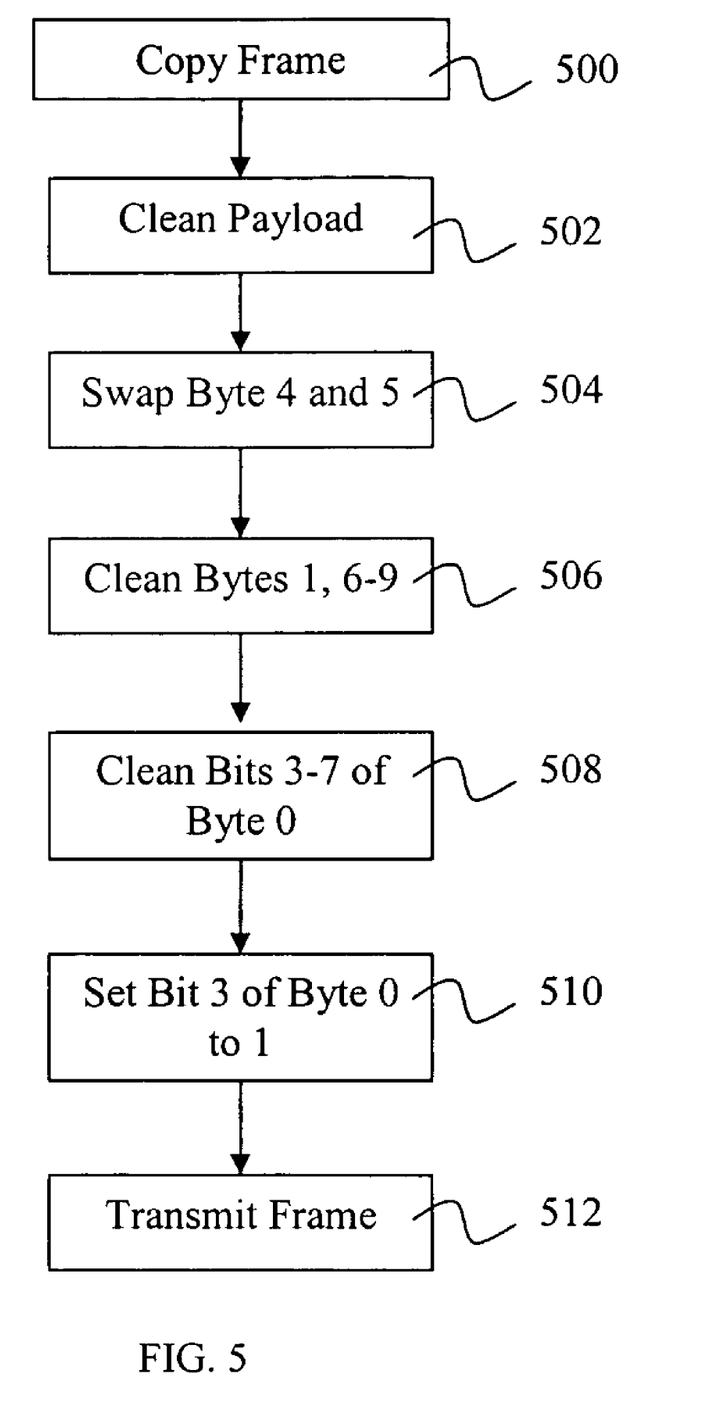
FIG. 5 is a flow diagram illustrating steps for executing the immediate acknowledge action for a received message in the institute of electrical engineers standard 802.15.3 protocol format.

FIG. 5 is a flow diagram illustrating steps for executing the immediate acknowledge action for a received message in the format of the 802.15.3 protocol. The immediate acknowledge action enables the lower MAC portion to respond to the acknowledge request instead of waiting for the upper MAC portion to process the acknowledge request and then send the respond request back to the lower MAC portion. This accelerates the response speed and in some embodiments guarantees that the system can respond within a required response time. In step 500, the incoming data frame is copied to the outgoing frame buffer. In step 502, the payload part of the outgoing frame buffer is cleaned so that only the header part remains. In step 504, the source and destination ID's are swapped; specifically, bytes 4 and 5 are swapped. In step 506, the upper part of frame control field, stream index, and fragmentation control are cleaned; specifically, bytes 1, and 6 through 9 are cleaned. In step 508, the frame type, security policy SEC, and a part of the ACK policy field are cleaned; specifically, bits 3 through 7 of byte 0 are cleaned. In step 510, the outgoing frame type is set to immediate acknowledge type frame; specifically, bit 3 of byte 0 is set to 1. In step 512, the frame is transmitted.

Figure 6:
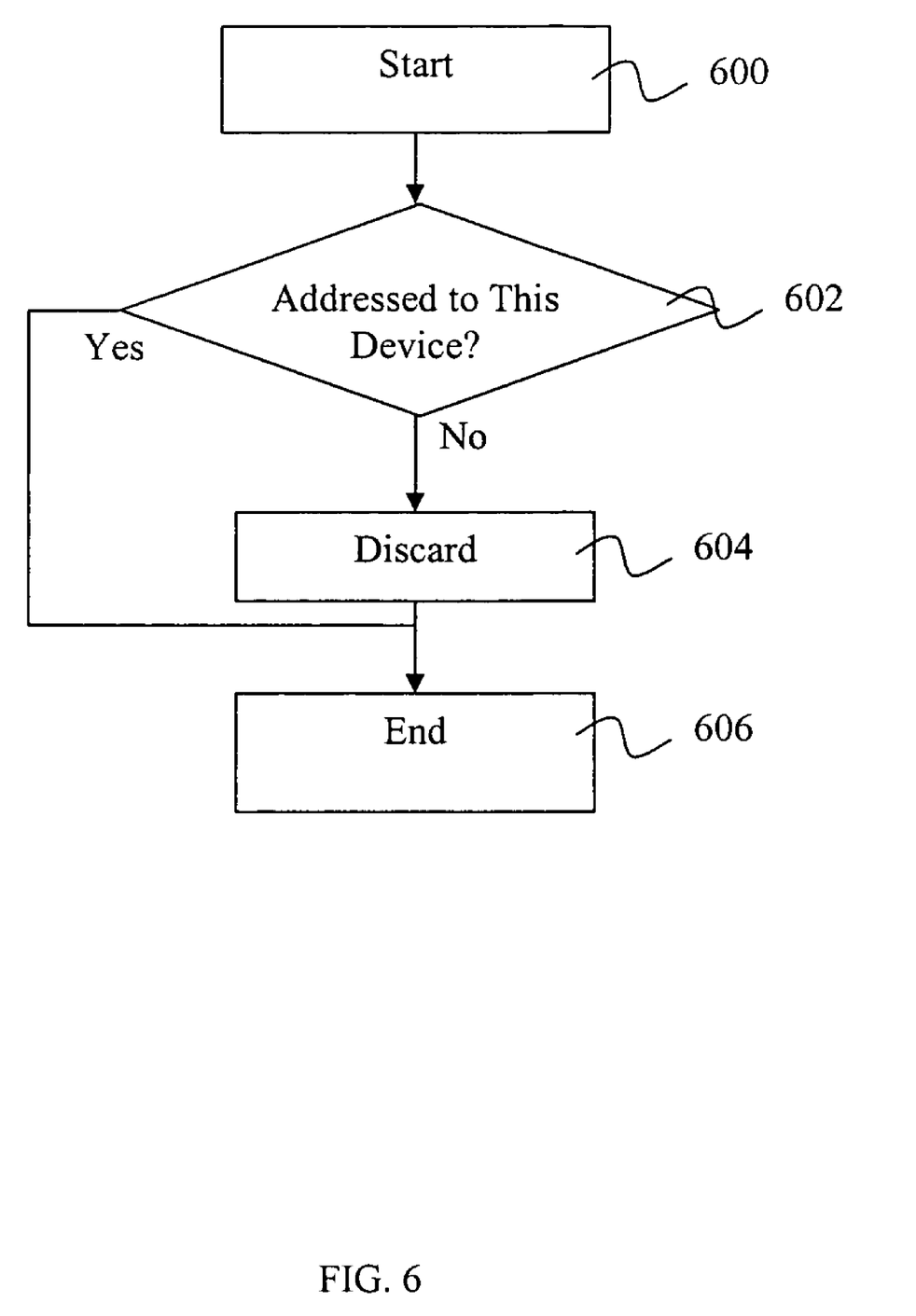
FIG. 6 is a flow diagram illustrating steps for executing the address check action.

FIG. 6 is a flow diagram illustrating steps for executing the address check action. The address check action allows the lower MAC portion to remove messages from the processing queue. This frees up the processor in the upper MAC portion and therefore improves processing efficiency of the system. In step 600, the process starts. In step 602, the destination ID defined by the data buffer location and mask is compared to the ID of the device defined by the pattern. If the ID's match, then step 604 is skipped. If the ID's do not match, the incoming frame is discarded in step 604. In step 606, the process ends.

Figure 7:
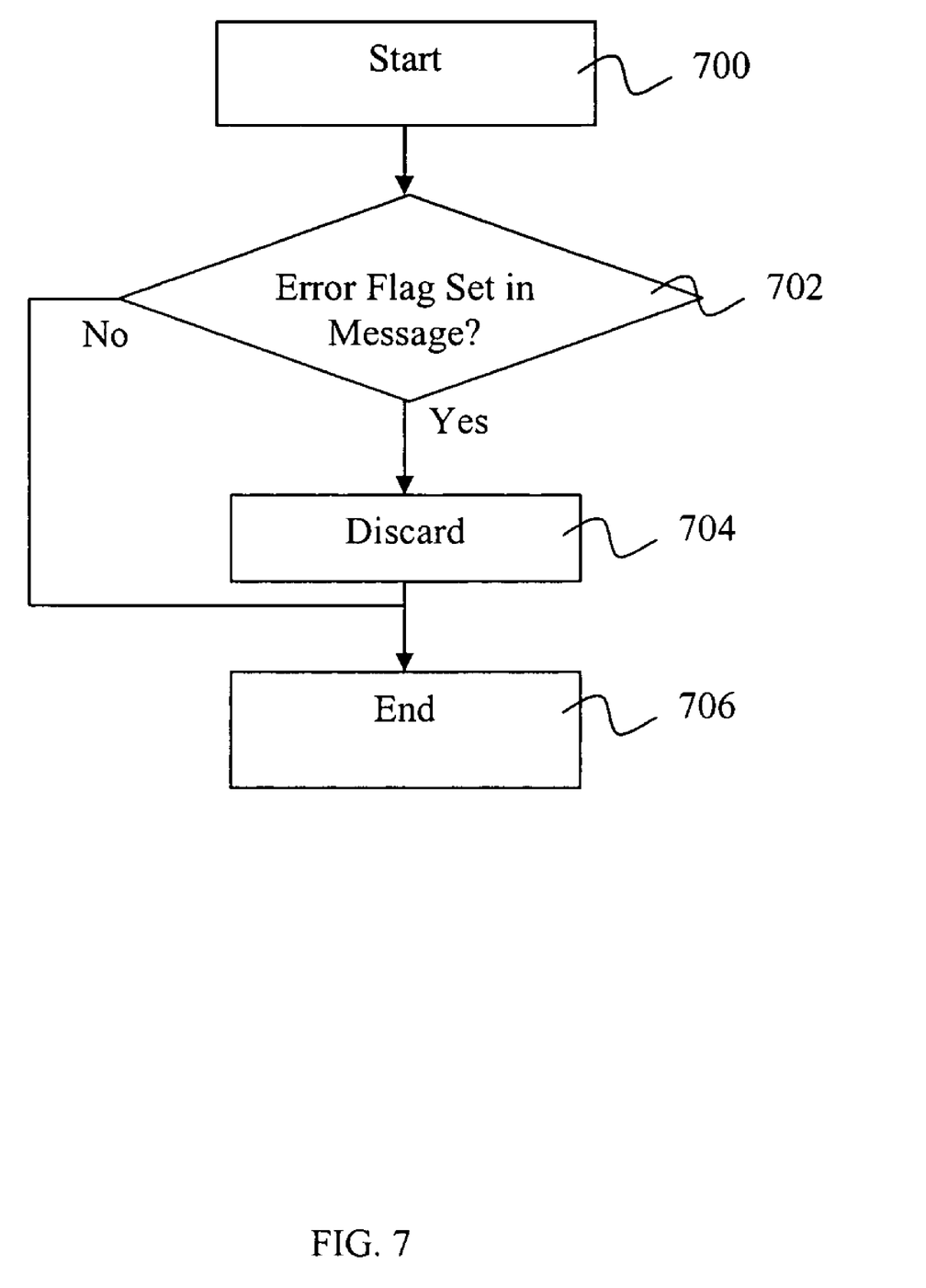
FIG. 7 is a flow diagram illustrating steps for executing the error flag check action.

FIG. 7 is a flow diagram illustrating steps for executing the error flag check action. The error flag check action allows the lower MAC portion to remove messages from the processing queue. This frees up the processor in the upper MAC portion and therefore improves processing efficiency of the system. In step 700, the process starts. In step 702, the header of the frame is checked to see if the error flag defined by the pattern, data buffer location and mask has been set. If the error flag is not set, then step 704 is skipped. If the error flag is set, then the incoming frame is discarded in step 704. In step 706, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A split MAC layer system comprising:
   an upper MAC portion wherein the upper MAC portion is dependent on a MAC protocol,
   a lower MAC portion wherein the lower MAC portion is independent of the MAC protocol,
   wherein the upper MAC portion communicates information to the lower MAC portion using an information structure including an action pointer, wherein the action pointer points to an action list that is defined by the upper MAC portion and performed by the lower MAC portion to improve response performance when processing a received message, and wherein the lower MAC interfaces with a physical layer device compatible with a wireless personal area network.

2. A split MAC layer system as in claim 1, wherein the action pointer points to an action list wherein an action defines a pattern related to the action.

3. A split MAC layer system as in claim 1, wherein the action pointer points to an action list wherein an action defines a buffer location related to the action.

4. A split MAC layer system as in claim 1, wherein the action pointer points to an action list wherein an action defines a mask related to the action.

5. A split MAC layer system as in claim 1, wherein the action pointer points to an action list wherein an action is a series of instructions that are performed by the lower MAC portion.

6. A split MAC layer system as in claim 1, wherein the action pointer points to an action list wherein an action defines a pattern, a buffer location, and a mask related to the action, wherein the action is executed if the pattern matches data in the buffer location as masked by the mask.

7. A split MAC layer system as in claim 1, wherein the action pointer points to an action list wherein an action is a series of instructions that are performed by the lower MAC portion to immediately acknowledge.

8. A split MAC layer system as in claim 1, wherein the action pointer points to an action list wherein an action is a series of instructions that are performed by the lower MAC portion to check an address.

9. A split MAC layer system as in claim 1, wherein the action pointer points to an action list wherein an action is a series of instructions that are performed by the lower MAC portion to check an error flag.

10. A method for splitting MAC layer system comprising:
    providing an upper MAC portion wherein the upper MAC portion is dependent on a MAC protocol,
    providing a lower MAC portion wherein the lower MAC portion is independent of the MAC protocol,
    sending an information structure including an action pointer from the upper MAC portion, and
    receiving the information structure by the lower MAC portion, wherein the action pointer points to an action list that is defined by the upper MAC portion and performed by the lower MAC portion to improve response performance when processing a received message, and wherein the lower MAC interfaces with a physical layer device compatible with a wireless personal area network.

11. A method for splitting MAC layer system as in claim 10, wherein the action pointer points to an action list wherein an action defines a pattern related to the action.

12. A method for splitting MAC layer system as in claim 10, wherein the action pointer points to an action list wherein an action defines a buffer location related to the action.

13. A method for splitting MAC layer system as in claim 10, wherein the action pointer points to an action list wherein an action defines a mask related to the action.

14. A method for splitting MAC layer system as in claim 10, wherein the action pointer points to an action list wherein an action is a series of instructions that are performed by the lower MAC portion.

15. A method for splitting MAC layer system as in claim 10, wherein the action pointer points to an action list wherein an action defines a pattern, a buffer location, and a mask related to the action, wherein the action is executed if the pattern matches data in the buffer location as masked by the mask.

16. A method for splitting MAC layer system as in claim 10, wherein the action pointer points to an action list wherein an action is a series of instructions that are performed by the lower MAC portion to immediately acknowledge.

17. A method for splitting MAC layer system as in claim 10, wherein the action pointer points to an action list wherein an action is a series of instructions that are performed by the lower MAC portion to check an address.

18. A method for splitting MAC layer system as in claim 10, wherein the action pointer points to an action list wherein an action is a series of instructions that are performed by the lower MAC portion to check an error flag.

* * * * *